J. R. SEMPLE.
PIANO ACTION BUSHING AND THE LIKE.
APPLICATION FILED JAN. 26, 1920.
1,369,196.
Patented Feb. 22, 1921.
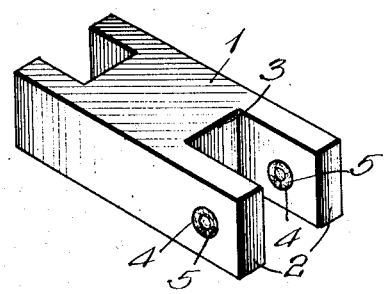
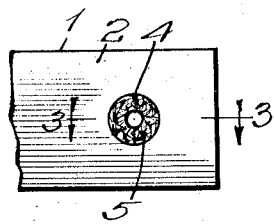
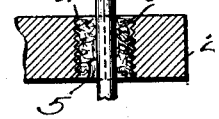
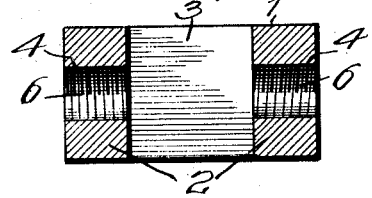
Witnesses:
W. F. Kilroy
Harry R. L. White
Inventor
James R. Semple
By Hill & Hill
Attys.

UNITED STATES PATENT OFFICE.

JAMES R. SEMPLE, OF CHICAGO, ILLINOIS, ASSIGNOR TO THE PIANO AND ORGAN SUPPLY COMPANY, OF CHICAGO, ILLINOIS, A CORPORATION OF ILLINOIS.

PIANO-ACTION BUSHING OR THE LIKE.

1,369,196.     Specification of Letters Patent.     Patented Feb. 22, 1921.

Application filed January 26, 1920. Serial No. 354,198.

*To all whom it may concern:*

Be it known that I, JAMES R. SEMPLE, a citizen of the Dominion of Canada, and a subject of the King of England, residing at Chicago, in the county of Cook and State of Illinois, have invented certain new and useful Improvements in Piano-Action Bushings or the like, of which the following is a description.

My invention belongs to that general class of devices known as piano action bushings, and relates particularly to a piano action part and bushing therefor. The bushing is applicable for various parts of a piano action, including the butt, lever or damper finger, flange or jack, whippen, abstract, tongue, tongue flange, etc. The invention has among its objects the production of a construction of the kind described that will be simple, convenient, efficient, durable, economical and satisfactory for use wherever found applicable. More particularly it has as an object the production of an efficient type of bushing in which the bushing is maintained in the part without the use of glue or like securing means. Many other objects and advantages of the construction herein shown and described will be obvious to those skilled in the art, from the disclosure herein given.

To this end my invention consists in the novel construction, arrangement and combination of parts herein shown and described and more particularly pointed out in the claim.

In the drawings, wherein like reference characters indicate like or corresponding parts.

Figure 1 is a perspective view of a flange with the bushings in place;

Fig. 2 is an enlarged view in elevation of one of the projecting parts of the flange and bushing;

Fig. 3 is a sectional view taken substantially on line 3—3 of Fig. 2; and

Fig. 4 is a sectional view through portions of the same, the bushings removed.

Referring to the drawings, 1 represents a suitable body part to be assembled in the piano action, it being understood that the particular shape and style of this part may vary, depending upon whether the same is a butt, lever or damper finger, flange or jack, whippen, abstract, tongue, tongue flange, or the like, and the same may be of the desired size and material. The particular part shown is provided with two projecting parts or flanges 2—2, the body being cut back as at 3 to provide these two tongues. The two parts 2 are provided with openings 4 within which are to be arranged the bushings 5. The bushings 5 are of felt or similar fabric, the same being formed and inserted in place in any desired manner, preferably by an automatically or manually operated machine or tool which need not be described herein.

The openings or holes 4 are preferably threaded as at 6—6, the thread may be formed in any desired manner, for example, by a suitable tap or the equivalent, that is of the desired pitch. As shown in Fig. 4, I ordinarily prefer to tap the threads from opposite sides so that they extend substantially right and left handed as indicated in Fig. 4. In Fig. 3 I have shown a portion of one of the pins 7 which extends through the bushing and the flange and serves to pivotally connect the parts of the action together. The thread may be comparatively shallow, but it is preferred that the edges be sharp so that when the pin is inserted the same will tend to force the bushing into engagement therewith, that is to say, expand the same so that the bushings are securely retained in place. Of course, the tendency of the bushing at the time of insertion is to expand to some extent and in fact its expansion is sufficient to cause the bushing to be securely maintained in its place. After the pin is inserted, however, this positively expands the bushing parts so that it is impossible to move the bushing or to have it become displaced lengthwise while the pin is in place. I have found in practice that with this construction the bushing is securely held without the use of glue, paste, or other additional securing means. By doing away with the glue, not only is the cost reduced, but there is no glue to get on the parts and necessitate cleaning off. In addition, the bushing is more soft and resilient since no glue has penetrated the felt, hardening the same. The bushings may likewise be cut to size, formed and inserted, since by doing away with the glue or the like the forming and insertion of the comparatively small bushings is greatly facilitated.

Having thus described my invention, it is obvious that various immaterial modifications may be made in the same without de- parting from the spirit of my invention; hence I do not wish to be understood as limiting myself to the exact form, construction, arrangement and combination of parts herein shown and described or uses mentioned.

What I claim as new and desire to secure by Letters Patent is:

A piano action part comprising a body having an opening therein, the wall of which is formed to interlock with a bushing, a bushing of displaceable substance adapted to be received in the opening, and means extending through the bushing adapted by its insertion to forcibly displace portions of the bushing to engage and interlock with the said interlocking wall of the body, said means serving as a pivot to connect the parts of the action together.

In testimony whereof, I have hereunto signed my name in the presence of two subscribing witnesses.

JAMES R. SEMPLE.

Witnesses:
 ROY W. HILL,
 BERTHA HARTMANN.